United States Patent Office 3,211,662
Patented Oct. 12, 1965

3,211,662
REACTIVE DISPERSIONS OF ALKALI
METAL ACETYLIDES
Abraham N. Kurtz, Charleston, W. Va., assignor to Union Carbide Corporation, a corporation of New York
No Drawing. Filed Feb. 8, 1963, Ser. No. 257,114
4 Claims. (Cl. 252—182)

This invention relates to a novel method for the production of dispersions of alkali metal acetylides in an organic diluent. More particularly, this invention relates to a method for producing very fine dispersions of alkali metal acetylides in an organic diluent, wherein the alkali metal acetylide is obtained in a highly reactive state.

Alkali metal acetylides, particularly sodium acetylide, are very useful as precursors for the formation of many organic compounds, including propiolic acid, acrylic acid, acetylenic secondary and tertiary alcohols and the like. However, the only known solvent for alkali metal acetylide is liquid ammonia, which is unsuitable as a reaction medium because it interferes with many of the reactions of the alkali metal acetylides. Thus, the reactions of alkali metal acetylides are normally conducted employing suspensions or dispersions of alkali metal acetylides in an inert organic diluent. As in most systems of this nature, the reactivity of the alkali metal acetylide increases with decreasing particle size. In the past, dispersions have generally been obtained by one of two methods. One method comprises the reduction of an alkali metal to the approximate size desired for the alkali metal acetylide, and then reacting the alkali metal with an alkyne to produce the alkali metal acetylide, which also has a particle size approximating that of the alkali metal. The second procedure, disclosed in U.S. Patent 2,194,363, comprises reacting an alkali metal with an alkyne in liquid ammonia to produce an ammoniacal solution of an alkali metal acetylide, admixing the ammoniacal solution with an organic diluent to obtain a three-plate, alkali metal acetylide/ammonia/organic diluent system, and then evaporating off the ammonia.

The invention comprises a modification of the latter of the two above-described processes, and concerns a process wherein the ammoniacal solution of the alkali metal acetylide is admixed with the inert organic diluent at a temperature in excess of the critical solution temperature of the ammonia-diluent system, whereby the alkali metal acetylide is dispersed in a homogeneous liquid phase of the ammonia and diluent. By operating in accordance with this modification it was unexpectedly and surprisingly found that, after removal of the ammonia, the dispersed alkali metal acetylide is obtained in a much more finely divided state, and therefore a more highly reactive state, than heretofore possible.

By the term "an alkali metal acetylide" or variations thereof, as employed in the specification and claims, is meant those well-known compounds wherein an alkali metal, such as lithium, sodium, potassium, rubidium or cesium, is bonded directly to an acetylenic carbon atom, the other acetylenic carbon atom being bonded to a hydrogen atom or a hydrocarbon radical which is free from acetylenic unsaturation. These compounds are represented by the general formula:

(1)   MC≡C—R wherein M is an alkali metal and R is either hydrogen or a hydrocarbon radical which is free from acetylenic unsaturation, such as alkyl including methyl, ethyl, propyl, isopropyl, butyl, tert.-butyl, amyl, 2-ethylhexyl, decyl, octadecyl and the like; alkenyl, such as vinyl, allyl, butenyl, octenyl and the like; aryl, such as phenyl or naphthyl; alkaryl such as tolyl, xylyl, mesityl and the like; aralkyl such as benzyl, phenethyl and the like; et cetera. In general the hydrocarbon radical can contain up to 20 carbon atoms, with radicals such as alkyl of 1 to 6 carbons, phenyl or vinyl being preferred.

The compounds are readily produced by the reaction of an appropriate, terminally-unsaturated alkyne with an alkali metal according to the equation:

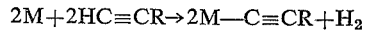  2M+2HC≡CR→2M—C≡CR+H₂ wherein M and R are as defined above. As examples of suitable alkali metal acetylides one can mention lithium acetylide, sodium acetylide, potassium acetylide, cesium acetylide, rubidium acetylide, sodium methylacetylide, sodium ethylacetylide, sodium propylacetylide, sodium isopropylacetylide, sodium hexylacetylide, sodium octadecylacetylide, sodium phenylacetylide, sodium vinylacetylide, and the like.

By the term "inert organic diluent," as employed in the specification and claims, is meant those well-known, normally-liquid organic compounds which are not solvents for and will not react with the alkali metal acetylide. Thus, compounds containing N-unsubstituted amido groups, halogen atoms, hydroxyl groups or carbonyl groups, whether in carboxylic acids, esters, ketones or aldehydes, are not suitable for use as diluents. As examples of compounds which can be employed as the inert organic diluent one can mention aliphatic hydrocarbons such as hexane, heptane, kerosene or ligroin (petroleum ether); aromatic hydrocarbons such as benzene, toluene, xylene, and the like; ethers, including acyclic monoethers such as diethyl ether, diisopropyl ether, dibutyl ether, methoxy benzene, vinyl butyl ether, dinonyl ether and the like, cyclic ethers such as tetrahydrofuran, tetrahydropyran, N-methylmorpholine and the like, and polyethers including 1,4-dioxane, methoxyethoxyethane, acetal, methylal, 1,1-dimethoxyethane, 1,1-diethoxybutane, 1,1-dimethoxy-4-methylpropane, diethoxymethane, 2-ethoxytetrahydropyran, 2-ethoxy-2,3-dihydropyran, 2,2-diethoxypropane, 1,1,5,5-tetraethoxy-3-methylpentane, 1,1,3,3-tetraethoxypropane, the dimethyl ether of diethylene glycol, the diethyl ether of diethylene glycol, diethoxytriglycol, 1,1-diethoxy-2-ethylhexane and the like.

The temperature which is employed for the admixing of the ammonia-alkali metal acetylide solution and the inert organic diluent will vary depending on the diluent employed. In general, temperatures above the critical solution temperature (the temperature at which ammonia becomes soluble in the diluent) are employed, with temperatures of at least about 10° C. higher than the critical solution temperature being preferred. The maximum temperature is not critical, and temperatures up to 75° C. or higher can be employed. However, because the mixing must be conducted under elevated pressure to maintain the ammonia in the liquid phase, lower temperatures are desired to obviate the necessity for equipment capable of use at extremely high pressures.

The critical solution temperature is readily determined by a simple experiment to determine the minimum temperature at which ammonia is soluble in the desired diluent. In addition, many of the critical solution temperatures for ammonia-diluent systems have been reported in the literature. (See for example A. W. Francis, "Critical Solution Temperature," Advances in Chemistry Series, vol 31, at pages 24, 25 and 212, American Chemical Society, Washington, D.C. (1961).)

It is clear that, prior to mixing, both the organic diluent and the ammonia/alkali metal acetylide solution do not have to be at temperatures above the critical solution temperature of the ammonia-diluent system. It is sufficient if the diluent and solution are at temperatures such that the resulting admixture will have a temperature in excess of the critical solution temperature.

As indicated above, when the process of this invention is conducted at temperatures in excess of the boiling point of ammonia ($-33.4°$ C.) it is necessary to maintain the system under pressure to prevent evaporation of the ammonia prior to the mixing. This can be used to advantage by employing the pressure on the ammonia alkali metal acetylide solution as the driving force for a rapid pressure injection of the solution into the inert organic diluent, whereby an even finer dispersion is produced because of the very rapid precipitation achieved.

The mixing can be accomplished either batchwise or continuously by injection of the ammonia/alkali metal acetylide solution into a flowing stream of diluent. In any case, however, the resulting admixture should be agitated to maintain the alkali metal acetylide particles in suspension. Agitation can be accomplished by any known method, such as by the use of stirrers, rocker bombs, or, in the case of continuous injection into a stream of diluent, by maintaining the diluent under turbulent flow conditions, and the like.

The ammonia is removed from the two-phase alkali metal acetylide/ammonia-diluent solution system by methods known to those skilled in the art, such as by evaporation, a nitrogen purge and the like.

The following examples are illustrative.

Example 1

Acetylene was bubbled through a solution of 23 grams of sodium in 500 milliliters of ammonia at $-40°$ C. for two hours at a rate of one mole of acetylene per hour. The resulting ammoniacal solution, containing one mole of sodium acetylide, was warmed to $25°$ C. and pressurized with nitrogen to 500 p.s.i.g. to prevent vaporization of the ammonia and to assist in the following operation. The solution was then injected into a 3-liter vessel, initially at atmospheric pressure and containing 800 ml. of toluene at $25°$ C., over a period of 30 seconds, while agitating the mixture by rocking the vessel. During this entire operation the 3-liter vessel was isolated from the atmosphere, being connected only to the vessel containing the solution of sodium acetylide in liquid ammonia. By operating in this manner there was obtained a two-phase mixture of sodium acetylide dispersed in a solution of ammonia in toluene. After holding the mixture for 15 minutes at $25°$ C., with rocking, the vessel was opened and the ammonia was vented to the atmosphere. Nitrogen was then bubbled through the mixture for 2 hours, after which time no ammonia odor could be detected in the effluent gas.

The reactivity of this dispersion was tested by reacting the sodium acetylide with carbon dioxide to produce sodium propiolate. Carbon dioxide at a pressure of 250 to 700 p.s.i.g was bubbled through the reaction mixture, which was maintained at a temperature of 25 to $30°$ C. The absorption of carbon dioxide ceased after 2.5 hours, indicating the reaction was complete. A small portion of the reaction mixture was filtered. The solids, after drying, were found to contain 59.3 weight percent sodium propiolate, as determined by titration with silver nitrate.

Example 2

The foregoing experiment was repeated, except that the ammonia-sodium acetylide solution was admixed with toluene at $-35°$ C. and atmospheric pressure. The resulting three-phase mixture of sodium acetylide, ammonia and toluene was then warmed to room temperature and stirred until substantially all of the ammonia was evaporated. After flushing with nitrogen, carbon dioxide at a pressure of 850 p.s.i.g. was passed through the mixture for 22 hours, at which time the reaction was stopped, even though absorption of carbon dioxide had not ceased, indicating the carbonation was not complete. The reaction product was too hazardous for analysis, a further indication of incomplete carbonation.

The results of Examples 1 and 2 demonstrate the necessity for admixing the ammonia solution with toluene under conditions sufficient to provide a one-phase mixture. In Example 1, here these conditions were maintained, a very fine and highly reactive dispersion of sodium acetylide in toluene was obtained. However, when these conditions were not maintained, as in Example 2, the sodium acetylide dispersion produced was not as reactive, as evidenced by the incomplete reaction with carbon dioxide after 22 hours.

Example 3

Employing apparatus and procedures similar to those described in Example 1, except that 800 ml. of the diethyl ether of diethylene glycol were substituted for the toluene, a finely divided dispersion of 0.82 mole of sodium acetylide in the diethyl ether of diethylene glycol was produced. The dispersion was carbonated in a manner similar to that described in Example 1, and the carbonation was complete after only one hour to produce a product containing 62.8 weight percent sodium propiolate.

What is claimed is:

1. In the method for producing a dispersion of an alkali metal acetylide in an inert organic diluent which comprises admixing a solution of an alkali metal acetylide in liquid ammonia with an inert organic diluent, said diluent being a liquid, organic non-solvent for and non-reactive with said alkali metal acetylide the improvement of effecting said admixing at a temperature in excess of the critical solution temperature of the ammonia-diluent system and a pressure sufficient to maintain the ammonia in the liquid phase whereby a dispersion of said alkali metal acetylide in a solution of ammonia and said diluent is obtained.

2. In the method for producing a dispersion of sodium acetylide in an inert organic diluent which comprises admixing a solution of sodium acetylide in liquid ammonia with an inert organic diluent, said diluent being a liquid, organic non-solvent for and non-reactive with said sodium acetylide the improvement of effecting said admixing at a temperature in excess of the critical solution temperature of the ammonia-diluent system and a pressure sufficient to maintain the ammonia in the liquid phase whereby a dispersion of sodium acetylide in a solution of ammonia and said organic diluent is obtained.

3. In the method for producing a dispersion of an alkali metal acetylide in an inert organic diluent which comprises admixing a solution of an alkali metal acetylide in liquid ammonia with an inert organic diluent, said diluent being a liquid, organic non-solvent for and non-reactive with said alkali metal acetylide the improvement of effecting said admixing at a temperature which is at least $10°$ C. in excess of the critical solution temperature of the ammonia-diluent system and a pressure sufficient to maintain the ammonia in the liquid phase whereby a dispersion of said alkali metal acetylide in a solution of ammonia and said organic diluent is obtained.

4. In the method for producing a dispersion of sodium acetylide in an inert organic diluent which comprises admixing a solution of sodium acetylide in liquid ammonia with an inert organic diluent, said diluent being a liquid, organic non-solvent for and non-reactive with said acetylide the improvement of effecting said admixing at a temperature which is at least 10° C. in excess of the critical solution temperature of the ammonia-diluent and a pressure sufficient to maintain the ammonia in the liquid phase whereby a dispersion of sodium acetylide in a solution of ammonia and said inert organic diluent is obtained.

References Cited by the Examiner

UNITED STATES PATENTS

| 2,194,363 | 3/40 | Macallum | 260—526 XR |
| 2,799,703 | 7/57 | Pachter | 260—533 XR |

OTHER REFERENCES

"Critical Solution Temperatures," Francis, Advances in Chemistry Series, A.C.S., No. 31 (1961) page 1.

JULIUS GREENWALD, *Primary Examiner.*

ALBERT T. MEYERS, *Examiner.*

UNITED STATES PATENT OFFICE
CERTIFICATE OF CORRECTION

Patent No. 3,211,662                      October 12, 1965

Abraham N. Kurtz

It is hereby certified that error appears in the above numbered patent requiring correction and that the said Letters Patent should read as corrected below.

Column 1, line 41, for "three-plate" read -- three-phase --; column 4, line 24, for "here" read -- where --.

Signed and sealed this 26th day of April 1966.

(SEAL)
Attest:

ERNEST W. SWIDER                      EDWARD J. BRENNER

Attesting Officer                      Commissioner of Patents